Nov. 26, 1940.  F. CONLON  2,222,705
DOG COVER
Filed May 28, 1940
FIG-1.
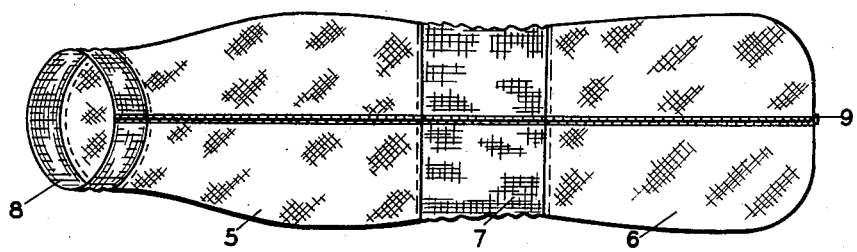
FIG-2.
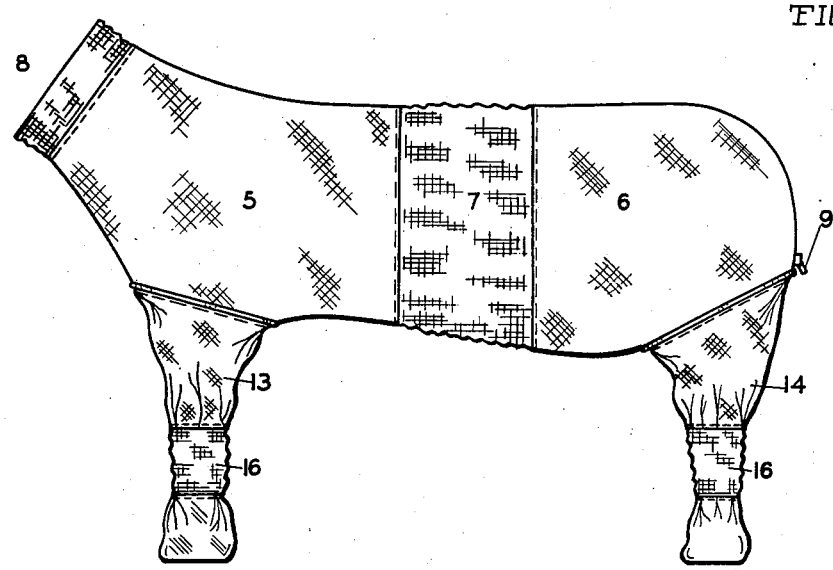
FIG-3.  FIG-4.  FIG-5.
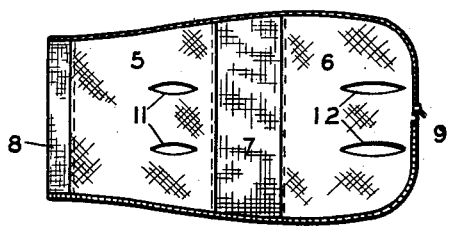 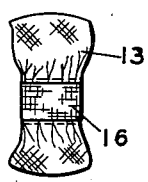 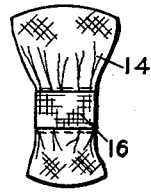
INVENTOR.
FLORENCE CONLON.
BY
ATTORNEY.

Patented Nov. 26, 1940

2,222,705

UNITED STATES PATENT OFFICE 2,222,705

DOG COVER

Florence Conlon, San Francisco, Calif.

Application May 28, 1940, Serial No. 337,608

2 Claims. (Cl. 54—79)

This invention relates to improvements in garments and has particular reference to a garment for a dog or other similar animal.

The principal object of this invention is to produce a garment which will fit all dogs within certain sizes and protect the dog against shedding hair and dirt on the upholstery of a vehicle.

A further object of the invention is to provide means for covering the feet of the dog at the same time so that the dog's claws will not scratch the paint in the car.

A further object of the invention is to produce a device of this character which will be comfortable, easy to apply, and neat in appearance.

Other objects and advantages will be apparent during the course of the following description.

In the accompanying drawing forming a part of this specification and in which like numerals are employed to designate like parts throughout the same, Fig. 1 is a top plan view of my cover;

Fig. 2 is a side elevation of Fig. 1;

Fig. 3 is a plan view of the body portion on a reduced scale;

Fig. 4 is a side elevation of the front leg and paw cover; and

Fig. 5 is a similar view of the rear leg and paw cover.

It is common practice to transport dogs, cats, and similar animals in vehicles; and in order to prevent the animal from scratching the upholstery or paint or shedding hairs on the vehicle, I have provided a cover which may be quickly placed over the dog, a cover which will be comfortable, and one which will accommodate a large number of dogs within certain limitations of size due to the fact that the garment has stretchable portions therein.

In the accompanying drawing wherein for the purpose of illustration is shown a preferred embodiment of my invention, the numerals 5 and 6 designate body portions joined together by a stretchable connecting portion 7. A stretchable neck band is shown at 8. The portions mentioned when attached together form a blank similar to that shown in Fig. 3; but when the margins of the blank are fastened together through the medium of a slidable fastener 9, the structure forms substantially a tubular casing for the dog, said structure having slits 11 and 12 through which the front and rear legs, respectively, of the dog may extend. Sewed within these slits 11 and 12 are tubular leg portions 13 and 14, respectively, each one of which has substantially midway of its length a resilient portion 16, the purpose of which will be later seen.

The result of this construction is that when the garment is placed upon the dog and the leg portions pulled up over the feet, the resilient portions 16 will act as cuffs to encircle the dog's legs with sufficient tension to be comfortable and yet to keep the lower portion of the leg cover about the feet of the dog. The portion 7 will also stretch to accommodate for dogs of various lengths within, of course, reasonable limitations. It is a fact that most dogs of a certain length are substantially the same girth, and, therefore, I have not found it necessary to provide any expansible feature as to girth.

It will thus be seen that with my cover upon a dog, the dog will be comfortable, the expansible portion 16 will not permit the leg cover to drop off the dog, and the dog will have full freedom of movement.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a dog cover, a blank portion having its margins secured together so as to form a substantially tubular structure, said tubular structure having a resilient portion substantially midway of its length, and tubular leg portions joined to said tubular portion and having resilient portions substantially mid-way of their length.

2. A dog cover comprising a pair of blank portions connected to an interposed resilient portion, a resilient neck portion secured to one of said blank portions, means for securing the margins of said garment to form a tubular structure, slits formed in said blank portions, tubular leg portions secured to said slits, and resilient portions formed in said leg portions substantially midway of their length.

FLORENCE CONLON.